United States Patent
Connery et al.

(10) Patent No.: US 8,270,488 B2
(45) Date of Patent: Sep. 18, 2012

(54) USING BLACK DETECTION TO IMPROVE VIDEO SPLICING

(75) Inventors: Glenn William Connery, Petaluma, CA (US); Alfred Palfreyman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1373 days.

(21) Appl. No.: 11/872,684

(22) Filed: Oct. 15, 2007

(65) Prior Publication Data

US 2009/0097572 A1  Apr. 16, 2009

(51) Int. Cl.
 *H04N 7/12* (2006.01)
 *H04N 11/02* (2006.01)
 *H04N 11/04* (2006.01)
 *H04B 14/04* (2006.01)
 *H04B 1/10* (2006.01)

(52) U.S. Cl. ............... 375/240.13; 375/240.27; 375/254

(58) Field of Classification Search .................. None
See application file for complete search history.

(56) References Cited

U.S. PATENT DOCUMENTS

| | | | |
|---|---|---|---|
| 6,380,991 B1 * | 4/2002 | Teichmer | 375/240.01 |
| 6,909,743 B1 * | 6/2005 | Ward et al. | 375/240.01 |
| 6,912,251 B1 * | 6/2005 | Ward et al. | 375/240 |
| 6,993,081 B1 * | 1/2006 | Brunheroto et al. | 375/240.28 |
| 2003/0206596 A1 * | 11/2003 | Carver et al. | 375/240.26 |

FOREIGN PATENT DOCUMENTS

WO  WO 2005025227 A1 *  3/2005

OTHER PUBLICATIONS

Norm Hurst et al.; Splicing FAQ; Dec. 8, 1997; pp. 1-8; http://www.mpeg.org/MPEG/splicing-FAQ.html.

* cited by examiner

*Primary Examiner* — Nishant B Divecha
(74) *Attorney, Agent, or Firm* — Merchant & Gould

(57) ABSTRACT

In one embodiment, a network device analyzes an encoded video stream using black detection before splicing video into the encoded video stream. When black data is detected, the network device determines whether insertion of a black intra frame with the spliced video will improve viewing upon decoding. The network device may also determine whether a splicing boundary indication included in the encoded video stream is accurate based on an observed transition between the detected black data and other data, and compensate the video splice accordingly.

22 Claims, 5 Drawing Sheets

USING BLACK DETECTION TO IMPROVE VIDEO SPLICING

TECHNICAL FIELD

The present disclosure relates generally to the field of networking.

BACKGROUND

Encoded video streams can be modified at a midpoint to include new content. For example, an advertisement insertion device can splice an advertisement into a designated portion of an encoded video stream. Numerous factors can affect whether a decoder, such as a television, displays undesired video artifacts attributable to the splicing.

For example, depending on where reference frames used for decoding were positioned in the encoded stream during the encoding, the splicing can cause macro-blocking to be displayed upon decoding. Also, indications inserted by the encoder to define the portion of the encoded video designated for mid-point replacement can be inaccurate. This inaccuracy can result in the spliced advertisement replacing a portion of program content or result in other problems observable upon decoding. The disclosure that follows solves these and other problems.

DESCRIPTION OF EXAMPLE EMBODIMENTS

Overview

Figure 1:
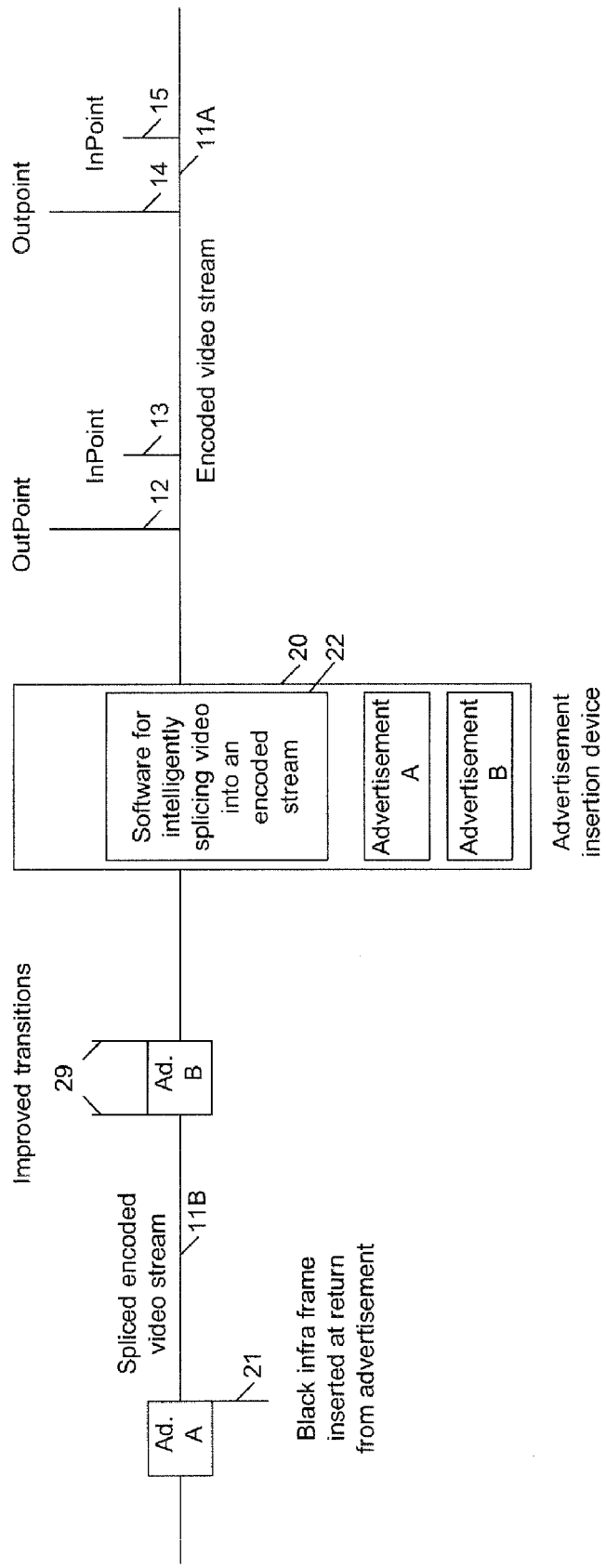
FIG. 1 illustrates a network device that uses black detection to intelligently splice video into an encoded video stream.

In one embodiment, a network device analyzes an encoded video stream using black detection before splicing video into the encoded video stream. When black data is detected, the network device determines whether insertion of a black intra frame with the spliced video will improve viewing upon decoding. The network device may also determine whether a splicing boundary indication included in the encoded video stream is accurate based on an observed transition between the detected black data and other data, and compensate the video splice accordingly.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates a network device that uses black detection to intelligently splice video into an encoded video stream.

An advertisement insertion device 20 or other network device receives a video stream 11A encoded by an encoder, such as a television network facility. The encoded video stream 11A includes advertisement availability segments each having a duration defined by an OutPoint (OP) and an InPoint (IP). The software 22 causes the device 20 to intelligently splice advertisements, such as locally stored advertisement segments A and B, into the encoded video stream 11A at the advertisement availability segments. The device 20 then outputs a spliced encoded video stream 11B that includes the advertisement segments A and B.

When the outputted video stream 11B is decoded, the intelligent insertion of the black intra frame 21, such as a Motion Pictures Expert Group protocol (MPEG) I-frame, prevents the decoding endpoint from displaying macro-blocking upon returning to a television program after displaying the advertisement segment. The conditions under which the software 22 inserts the black intra frame 21, as well as an explanation for how the black intra frame 21 prevents macro-blocking, will be provided later with reference to FIG. 2.

Still referring to FIG. 1, when decoding of the outputted video stream 11B progresses through improved transitions 29 that are provided by the device 20, more gradual transitions are displayed between the program and the beginning of advertisement segment B and/or between the end of advertisement segment B and the program. For example, the improved transitions 29 provide features such as preventing the advertisement segment B from cutting off a portion of the program, preventing the program from cutting off a portion of the advertisement segment B, filling a content gap by inserting a visual effect such as fade from advertisement or a fade from program, or eliminating a content gap. The functions performed by the device 20 to provide these features will be provided later with reference to FIGS. 3 and 4.

Figure 2:
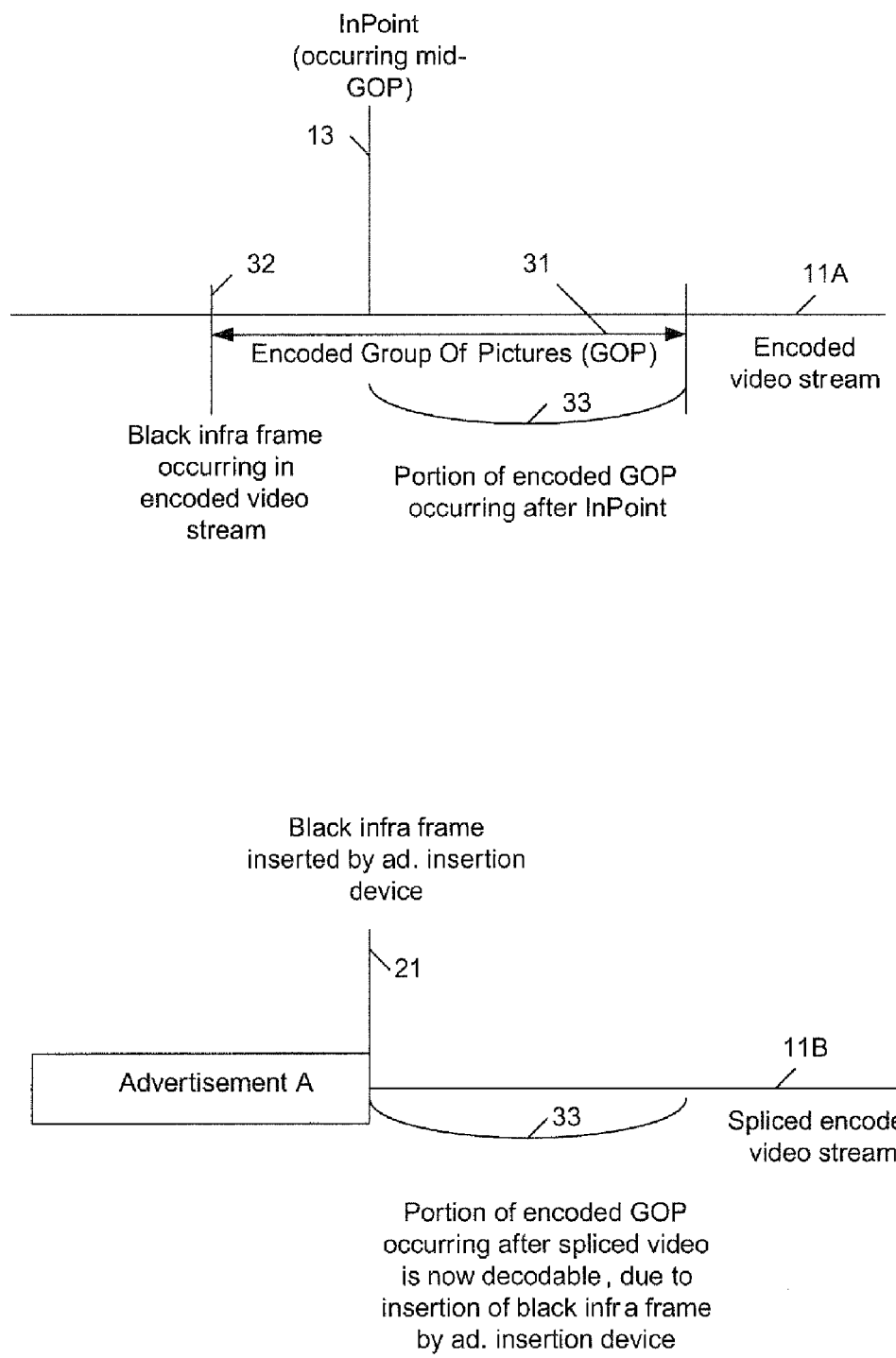
FIG. 2 illustrates one example of how the network device shown in FIG. 1 inserts a black intra frame when splicing video into an encoded video stream.

FIG. 2 illustrates one example of how the network device shown in FIG. 1 inserts a black intra frame when splicing video into an encoded video stream.

The video stream 11A is encoded by an origination point using MPEG in the present example; however, in other examples the video stream 11A may be encoded using any video compression protocol. MPEG and other video compression protocols utilize Groups Of Pictures (GOPs) to compress video. The GOPs 31 includes one or more intra frames, such as I-frame 32, encoded into the stream 11A along with other frames, such as P and B frames that are decodable using information from the I-frame 32. When an encoding results in an intra frame occurring at the IP 13 for the video splice, the video splice decodes generally without displaying macroblocking.

Otherwise, when the IP 13 for the video splice intersects the GOP 31 as shown in FIG. 2, the I-frame 32 occurring just before the InPoint 13 is overwritten by the advertisement segment A, and is thus unavailable for decoding the portion 33 of the network feed. The unavailability of the I-frame 32 prevents the decoder from decoding the portion 33, which causes macro-blocking to be displayed.

The present advertisement insertion device 20 performs black detection to determine whether the portion 33 occurring after the IP 13 depends on an encoded black intra frame that will be overwritten by the video splice. In the present embodiment, black detection is performed by analyzing whether the encoded video stream 11A includes a black P-frame at the or shortly after IP 13. The existence of this black P frame indicates that the IP 13 intersects the GOP 13, and that the associated intra frame 32 is black. This method of black detection is particularly efficient in terms of processing resources; however, in other embodiments any method may be used to determine whether the portion 33 occurring after the IP 13 depends on an encoded black intra frame that will be overwritten by the video splice.

When the portion 33 corresponds to one or more black images (i.e. the I-frame 32 represents a black image), the device 20 inserts a black I-frame 21 into the video stream 11B during the video splicing. This black I-frame 21 may be generated once and archived for later used, or generated responsive to the black detection. The black intra frame 21 can also be referred to as a low luma frame because bits included in that frame to represent luminescence are set to zero (or close to zero), which causes a black image to be displayed. The inclusion of the black I-frame 21 during the video splice allows the decoder to decode the portion 33 so that macroblocking is not displayed on an endpoint when cutting back to the network feed.

When the portion 33 does not depend on black images, in the present embodiment no black I-frame 21 is inserted and some other technique may be used to address the macroblocking. However, it has been empirically observed that black data is frequently encoded adjacent to the designated IPs, and accordingly, the black intra frame 21 can be frequently used to prevent or reduce macroblocking.

Minimal processing resources are required to generate and splice the black intra frame 21, which makes this technique particularly desirable for network devices with relatively low processing power and/or an inability to record the video stream. In other words, this technique allows a network device having relatively low processing resources to frequently resolve this type of macroblocking. Other example systems that include midpoints having ample processing resources and/or the correct codec available, may record the stream to adjust the intra frame 32 to occur at the IP 13 when the detected data is not black.

Although the above described embodiment is described with respect to splicing an advertisement in an MPEG encoded stream, it should be apparent that other embodiments splice any video content into any stream that is encoded using a video compression protocol. The intra frame in the present example is an MPEG I-frame; however, in other examples may be any frame that does not depend on other frames for decoding. Although the above described embodiment is described with respect to black data, it should be apparent that other embodiments may be configured to detect different patterns of data that are also conducive to generating a replacement intra frame using little processing power.

The network device 20 is referred to as a midpoint because it is logically located between an encoder and a decoder. It should be apparent that the network device 20 may be located in close physical proximity to the encoder and/or the decoder.

Figure 3:
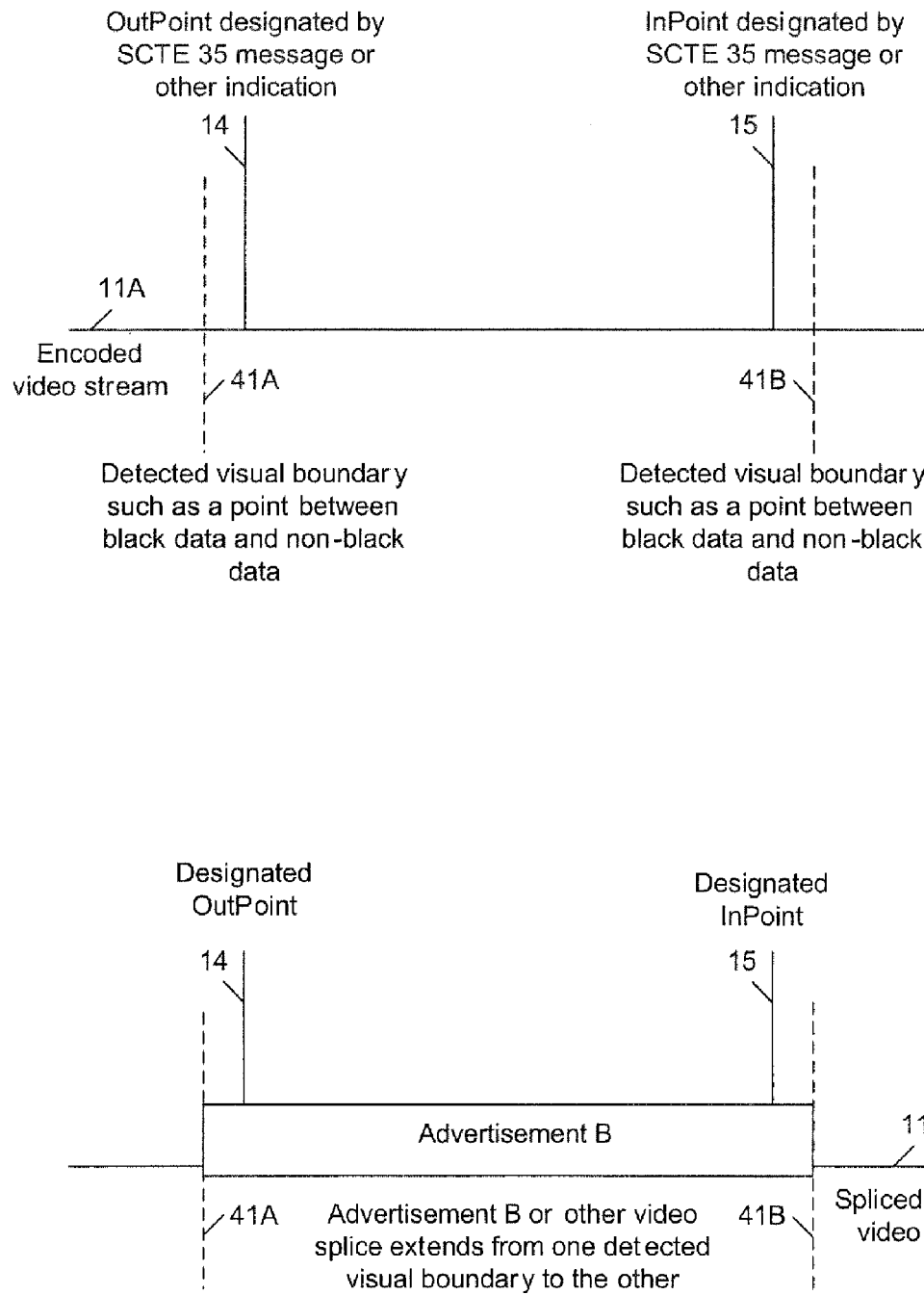
FIG. 3 illustrates one example of how the network device shown in FIG. 1 splices video into an encoded video stream according to a visual boundary.

FIG. 3 illustrates one example of how the network device shown in FIG. 1 splices video into an encoded video stream according to a visual boundary.

The encoded video stream 11A includes OP/IP designation messages such as Society of Cable Telecommunication Engineers (SCTE) "35" messages for identifying the designated OP/IP pair 14 and 15. These SCTE 35 messages are encoded into the stream 11A by an encoder to signal the boundaries of the advertisement availability. It has been empirically observed that these SCTE 35 messages are often "inaccurate," in that they occasionally designate OP/IP pairs that include a portion of the program or that they occasionally leave excess time between the program and the advertisement availability.

As stated previously, black data is often inserted between a program and an advertisement availability. By performing black detection adjacent to the designated boundaries 14 and 15 to locate transitions between black data and non-black data, the device 20 can identify visual boundaries 41A and 41B. These visual boundaries 41A and 41B are typically better indications of an end of a program or a beginning of a program than the "inaccurate" SCTE 35 messages.

The device 20 utilizes these visual boundaries 41A and 41B when splicing the advertisement B into the video stream 11B. For example, as shown in FIG. 3, the advertisement B may have a duration longer than a duration of the designated advertisement availability. Utilizing the visual boundaries 41A and 41B allows the advertisement B to be spliced between program segments without cutting off portions of those segments.

The advantages provided in the illustrated example should be apparent. Whereas an endpoint decoding a conventional splice would have displayed the program, followed by blackness, followed by a late introduction to the advertisement B, followed by an early exit from advertisement B, followed by blackness before resuming the program, an endpoint decoding the stream 11B will display an improved sequence. Namely, the program will transition to the beginning of the advertisement B followed by a transition back to the program at the end of advertisement B.

It should be apparent that the example shown does not limit how the visual boundaries 41A and 41B can be used to shift placement of the advertisement B, such as slightly before/after the designated advertisement availability, or slightly shorter/longer than the designated advertisement availability. Although the above described embodiment is described with respect to black data, it should be apparent that other embodiments may be configured to detect different patterns of data empirically associated with a boundary of program content.

Figure 4:
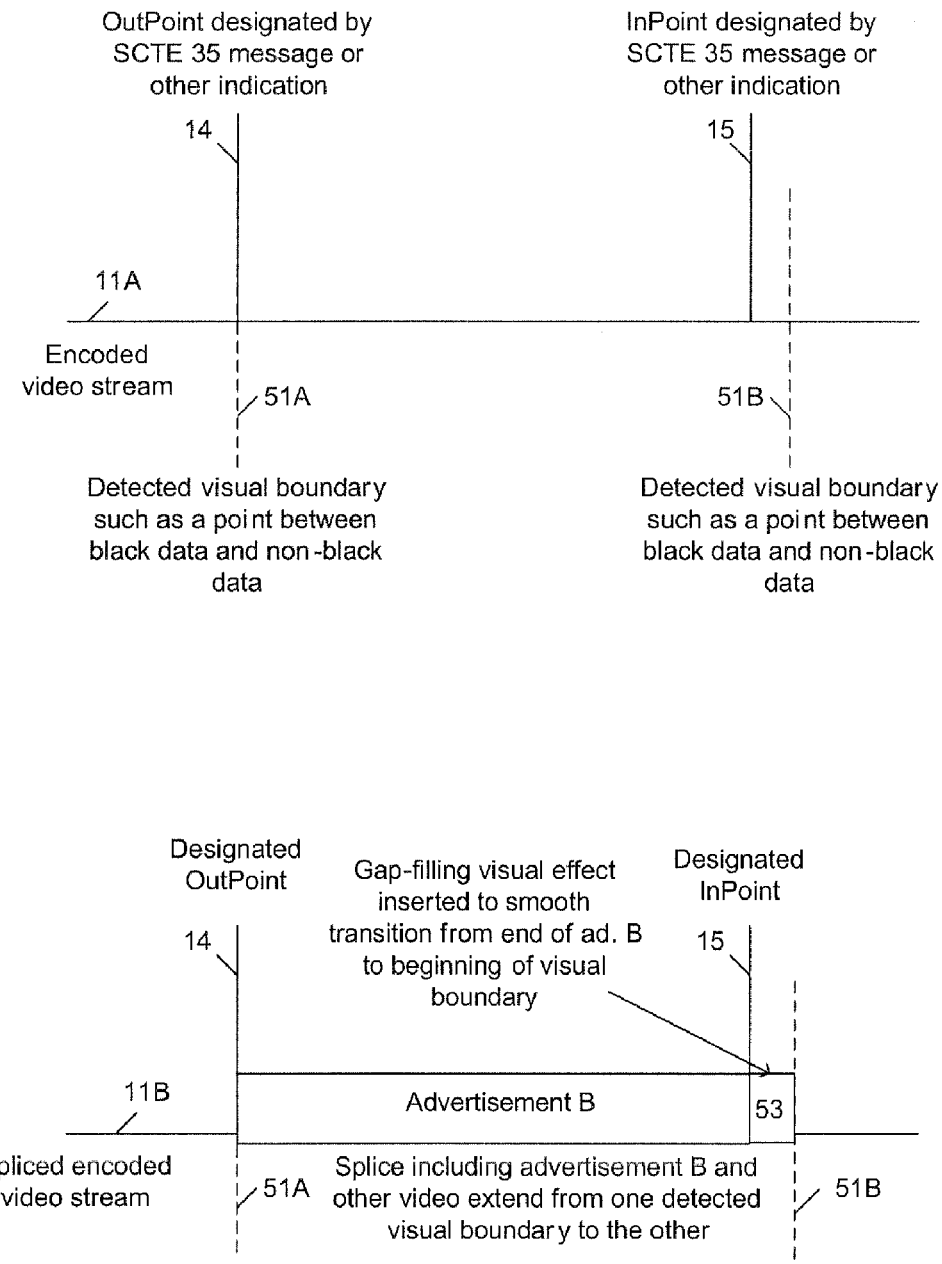
FIG. 4 illustrates another example of how the network device shown in FIG. 1 splices video into an encoded video stream according to a visual boundary.

FIG. 4 illustrates another example of how the network device shown in FIG. 1 splices video into an encoded video stream according to a visual boundary.

In another example, the visual boundaries 51A and 51B may be arranged in a different manner from the designated OP/IP pair 14 and 15 such that the advertisement B has a shorter duration than a segment defined by the visual boundaries. In such examples, a gap-filling visual effect 53 that is preferable to blackness may be spliced into the black segment revealed by identifying the visual boundary 51A. For example, the visual effect 53 may be a fade from advertisement effect, or the advertisement B may be shifted earlier to use a fade from program effect.

The advantages provided by this additional example should be apparent. Whereas an endpoint decoding a conventional splice would have displayed a jarring brief flash of blackness between then end of advertisement B and the return of the program, an endpoint decoding the stream 11B will display a visual effect 53, such as a fade, that produces a more gradual transition from the advertisement B to the program than black data.

Figure 5:
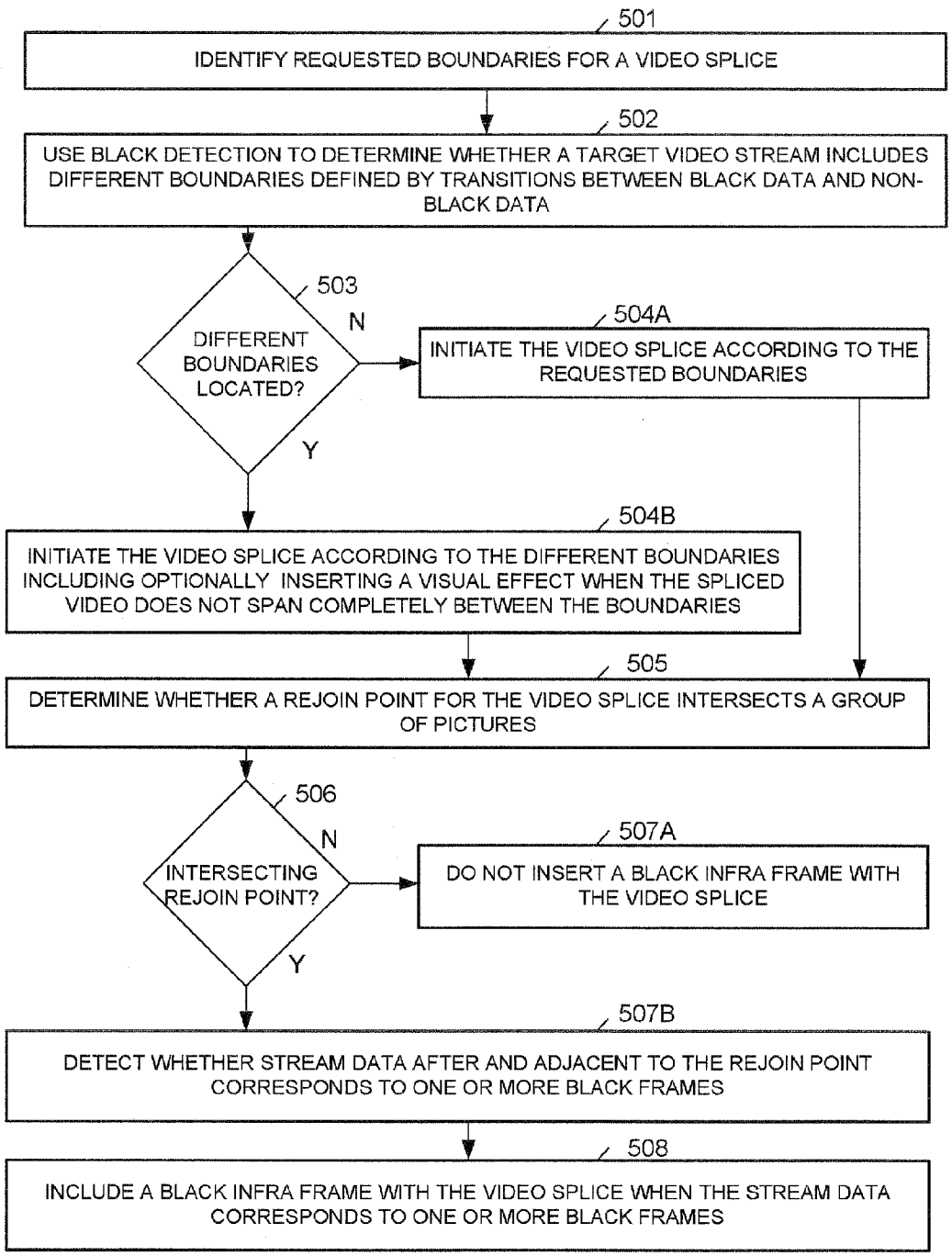
FIG. 5 illustrates an example method for using the network device illustrated in FIG. 1.

FIG. 5 illustrates an example method for using the network device illustrated in FIG. 1.

In block 501, the network device 20 identifies requested boundaries for a video splice. In block 502, the network device 20 uses black detection to determine whether a target video stream includes different boundaries defined by transitions between black data and non-black data. When the different boundaries are not located in decision box 503, the network device 20 initiates the video splice according to the requested boundaries in block 504A.

When the different boundaries are located in decision box 503, the network device 20 initiates the video splice according to the located boundaries in block 504B. Also in block 504B, the network device 20 may insert a visual effect when the spliced video does not span completely between the boundaries.

In block 505, the network device 20 determines whether a rejoin point for the video splice intersect a group of pictures, such as an MPEG GOP. When the rejoin point does not intersect the group of pictures in decision box 506 because an intra frame is encoded at the rejoin point, the network device 20 does not insert a black intra frame with the video splice in block 507A.

When the rejoin point does intersect the group of pictures in decision box 506 because no intra frame is encoded at the rejoin point, the network device 20 detects whether stream data after and adjacent to the rejoin point corresponds to one or more black frames in block 507B. In block 508, the network device 20 includes a black intra frame with the video splice when the stream data corresponds to one or more black images.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method comprising:
    receiving an encoded video stream;
    identifying a rejoin point for a video splice intersecting a single group of pictures originally included in the encoded video stream;
    wherein the originally included single group of pictures has a first frame and a last frame, and wherein the identified rejoin point is after the first frame or before the last frame;
    determining whether originally included encoded data located in the originally included single group of pictures after the intersecting rejoin point corresponds to a black image; and
    inserting a black intra frame into the encoded video stream with the video splice in response to determining that the originally included encoded data located in the originally included single group of pictures after the intersecting rejoin point corresponds to a black image,
    the black intra frame configured to be used by a decoder for decoding said originally included encoded intra frame.

2. The method of claim 1, further comprising:
    identifying messages in the encoded video stream the messages indicating an advertisement availability;
    using black detection on a portion of the encoded video stream that is adjacent to the identified messages to locate transitions between black data and non- black data; and
    initiating the video splice according to the located transitions between the black data and the non-black data.

3. The method of claim 2, further comprising splicing an advertisement into a region of the encoded video stream that is different than the indicated advertisement availability.

4. The method of claim 3, wherein the region includes a segment of program content that comprises the black data, the segment located outside the indicated advertisement availability.

5. The method of claim 2, further comprising:
    determining whether a first duration of the advertisement availability is shorter than a second duration of a region bounded by the located transitions; and
    splicing a visual transition effect along with a television advertisement segment when the first duration is shorter than the second duration.

6. The method of claim 5, wherein the visual transition effect includes a fade to advertisement effect.

7. The method of claim 6, wherein the visual transition effect also includes a fade to television program effect.

8. An apparatus, comprising:
    a processing device configured to receive an encoded video stream;
    the processing device configured to identify a rejoin point for a video splice intersecting a single group of pictures originally included in the encoded video stream;
    wherein the originally included single group of pictures has a first frame and a last frame, and wherein the identified rejoin point is after the first frame or before the last frame;
    the processing device configured to determine whether originally included encoded data located in the originally included single group of pictures after the intersecting rejoin point corresponds to a black image; and the processing device configured to insert an independently decodable black frame into the encoded video stream with the video splice in response to determining that the originally included encoded data located in the originally included single group of pictures after the intersecting rejoin point corresponds to a black image, the inserted independently decodable black frame configured to be used by a decoder for decoding said originally included encoded data.

9. The apparatus of claim 8, wherein the encoded video stream is encoded using Motion Pictures Expert Group protocol (MPEG), and the processing device is further configured to: perform the determination by checking whether a black P-frame is encoded adjacent to the intersecting rejoin point.

10. The apparatus of claim 8, wherein the processing device is further configured to: identify a transition time indication message included in the encoded video stream; detect a transition between black data and non-black data included in the encoded video stream; and compare the detected transition to the identified time indication message.

11. The apparatus of claim 10, wherein the processing device is further configured to: identify a position in the encoded video stream for inserting an advertisement, the position selected by an encoder; and shift the video splice from the encoder-selected position according to the detected transition.

12. The apparatus of claim 10, wherein the rejoin point is determined by comparing the detected transition to the identified time indication message.

13. The apparatus of claim 10, wherein the processing device is further configured to: determine a first duration using the detected transition; determine whether the first duration is longer than a second duration of an advertisement used for the video splice; and splice a visual effect into the encoded video stream between the advertisements and an encoded program when the first duration is longer than the second duration.

14. The apparatus of claim 8, wherein a result of the video splice includes a new group of pictures that is different from each group of pictures of the encoded video stream and that is different from each group of pictures of the video splice, the new group of pictures comprising at least a first frame and a second frame.

15. The apparatus of claim 14, wherein the first frame of the new group of pictures is the independently decodable black frame and the second frame of the new group of pictures is from said encoded data.

16. A memory device having instructions stored thereon that, in response to execution by a processing device, cause the processing device to perform operations comprising:

receiving an encoded video stream;

identifying a rejoin point for a video splice intersecting a single group of pictures originally included in the encoded video stream;

wherein the originally included single group of pictures has a first frame and a last frame, and wherein the identified rejoin point is after the first frame or before the last frame;

determining whether originally included encoded data located in the originally included single group of pictures after the intersecting rejoin point corresponds to a black image; and inserting a black intra frame into the encoded video stream with the video splice in response to determining that the originally included encoded data located in the originally included single group of pictures after the intersecting rejoin point corresponds to a black image, the black intra frame configured to be used by a decoder for decoding said originally included encoded intra frame.

17. The memory device of claim 16, wherein the operations further comprise:

identifying messages in the encoded video stream the messages indicating an advertisement availability;

using black detection on a portion of the encoded video stream that is are adjacent to the identified messages to locate transitions between black data and non-black data; and initiating the video splice according to the located transitions between the black data and the non-black data.

18. The memory device of claim 17, wherein the operations further comprise splicing an advertisement into a region of the encoded video stream that is different than the indicated advertisement availability.

19. The memory device of claim 18, wherein the region includes a segment of program content that comprises the black data, the segment located outside the indicated advertisement availability.

20. The memory device of claim 17, wherein the operations further comprise: determining whether a first duration of the advertisement availability is shorter than a second duration of a region bounded by the identified transitions; and splicing a visual transition effect along with a television advertisement segment when the first duration is shorter than the second duration.

21. The memory device of claim 20, wherein the visual transition effect includes a fade to advertisement effect.

22. The memory device of claim 21, wherein the visual transition effect also includes a fade to television program effect.

* * * * *